United States Patent
Mahira et al.

(10) Patent No.: US 10,794,258 B2
(45) Date of Patent: Oct. 6, 2020

(54) EXHAUST PIPE STRUCTURE FOR IN-LINE FOUR-CYLINDER INTERNAL COMBUSTION ENGINE

(71) Applicant: HONDA MOTOR CO., LTD., Tokyo (JP)

(72) Inventors: Hiroshi Mahira, Wako (JP); Satoru Yamasaki, Wako (JP); Yasuhiro Morimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/542,374

(22) Filed: Aug. 16, 2019

(65) Prior Publication Data

US 2020/0080464 A1 Mar. 12, 2020

(30) Foreign Application Priority Data

Sep. 11, 2018 (JP) .................................. 2018-169548

(51) Int. Cl.
*F01N 13/18* (2010.01)
*F16L 47/02* (2006.01)
*F01N 13/10* (2010.01)

(52) U.S. Cl.
CPC ....... *F01N 13/1838* (2013.01); *F01N 13/105* (2013.01); *F16L 47/02* (2013.01); *F01N 2450/22* (2013.01)

(58) Field of Classification Search
CPC ............. F01N 2450/22; F01N 2470/00; F01N 2470/06; F01N 2340/04; F01N 13/107;

(Continued)

(56) References Cited

U.S. PATENT DOCUMENTS 5,271,477 A * 12/1993 Gekka ...................... F01N 3/28
180/219
5,579,639 A * 12/1996 Shimoji .................. F01N 13/08
60/322

(Continued)

FOREIGN PATENT DOCUMENTS

| JP | H10-246111 A | 9/1998 |
| JP | 2013-115870 | 6/2013 |
| JP | 2014-234750 | 12/2014 |

OTHER PUBLICATIONS

Japanese Office Action with English translation dated Jun. 2, 2020, 7 pages.

*Primary Examiner* — Mark A Laurenzi
*Assistant Examiner* — Mickey H France
(74) *Attorney, Agent, or Firm* — Rankin, Hill & Clark LLP

(57) ABSTRACT

An exhaust pipe structure for an in-line four-cylinder internal combustion engine includes: an in-line four-cylinder internal combustion engine; four exhaust pipes connected with respective exhaust ports in respective cylinders of the internal combustion engine; and a converging exhaust pipe connected with a converging portion at which downstream ends of all the exhaust pipes converge. In this exhaust pipe structure, the exhaust pipes are each configured as a dual pipe including an outer pipe and an inner pipe disposed inside the outer pipe. At the converging portion, the four exhaust pipes are arrayed linearly in parallel with each other, and the outer pipes of adjacent ones of the exhaust pipes are directly welded with each other at the downstream ends.

7 Claims, 9 Drawing Sheets

(58) Field of Classification Search
CPC .......... F01N 13/141–146; F01N 13/10; F01N 13/102; F01N 13/08; F01N 13/1805
USPC .......................... 60/320, 323, 324, 305, 322
See application file for complete search history.

(56) References Cited

U.S. PATENT DOCUMENTS

| | | | | |
|---|---|---|---|---|
| 6,122,911 | A * | 9/2000 | Maeda | F01N 13/102 285/131.1 |
| 6,155,046 | A * | 12/2000 | Kato | F01N 13/102 60/322 |
| 7,540,347 | B2 * | 6/2009 | Taniguchi | F01N 1/084 180/219 |
| 9,708,963 | B2 * | 7/2017 | Hayama | F01N 1/00 |
| 2005/0039448 | A1 * | 2/2005 | Terashima | F02B 29/06 60/323 |
| 2010/0326961 | A1 * | 12/2010 | Nakajima | B23K 11/066 219/66 |
| 2014/0352288 | A1 * | 12/2014 | Iwata | F01N 13/1888 60/323 |

\* cited by examiner

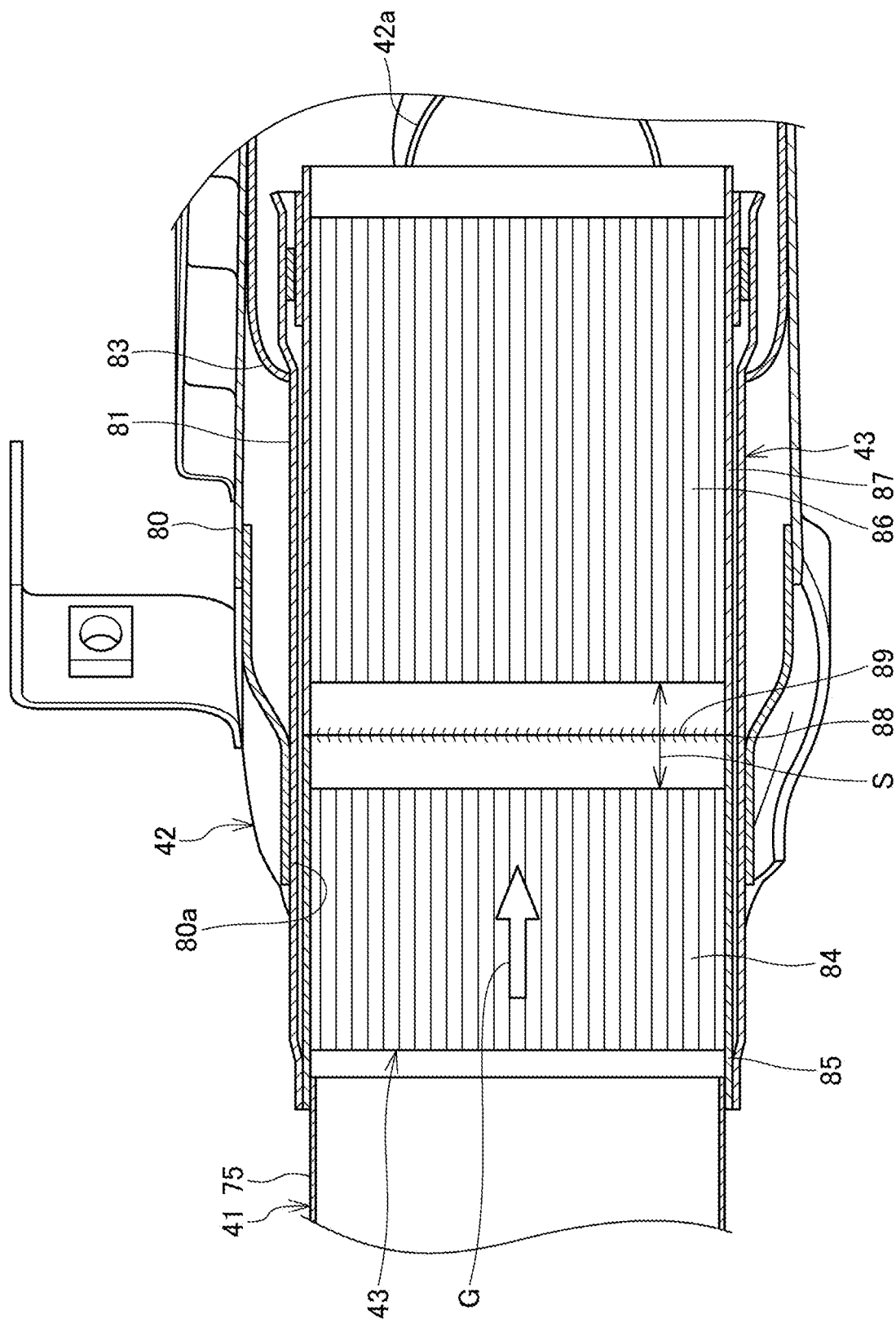

EXHAUST PIPE STRUCTURE FOR IN-LINE FOUR-CYLINDER INTERNAL COMBUSTION ENGINE

INCORPORATION BY REFERENCE

The present application claims priority under 35 U.S.C. § 119 to Japanese Patent Application No. 2018-169548 filed on Sep. 11, 2018. The content of the application is incorporated herein by reference in its entirety.

TECHNICAL FIELD

The present invention relates to an exhaust pipe structure for an in-line four-cylinder internal combustion engine.

BACKGROUND ART

A hitherto known exhaust pipe structure for an in-line four-cylinder internal combustion engine includes four single-pipe exhaust pipes disposed linearly in juxtaposition with each other and a converging exhaust pipe connected with a converging portion at which downstream ends of all of the exhaust pipes converge (see, for example, Patent Document 1). In the configuration disclosed in Patent Document 1, the four exhaust pipes are welded via a collar member (connection pipe) fitted over an outer periphery of each of the exhaust pipes. The foregoing configuration prevents, at the downstream end of the exhaust pipe, a back bead of a weld from affecting an inner peripheral surface side of the exhaust pipe, to thereby ensure an efficient flow of exhaust gases.

PRIOR ART DOCUMENT

Patent Document

Patent Document 1

Japanese Patent Laid-Open No. 2013-115870

SUMMARY OF THE INVENTION

Problem to be Solved by the Invention

The hitherto known exhaust pipe structure for an in-line four-cylinder internal combustion engine described above involves an enlarged size of the exhaust pipes in a direction in which the exhaust pipes are arrayed because of the collar members disposed on the outer peripheries of the exhaust pipes. A need thus exists for reduction in size of the exhaust pipes in the direction in which the exhaust pipes are arrayed. Another need exists for an improved heat retaining property of the exhaust pipes with the aim of, for example, quickly increasing a temperature of a catalyst apparatus.

The present invention has been made in view of the foregoing situation and it is an object of the present invention to enable exhaust pipes to be disposed compactly in a direction in which the exhaust pipes are arrayed and a heat retaining property of the exhaust pipes to be improved.

Means for Solving the Problem

An aspect of the present invention provides an exhaust pipe structure for an in-line four-cylinder internal combustion engine. The exhaust pipe structure for an in-line four-cylinder internal combustion engine includes an in-line four-cylinder internal combustion engine (11), four exhaust pipes (40a, 40b, 40c, 40d) connected with respective exhaust ports in respective cylinders of the internal combustion engine (11), and a converging exhaust pipe (41) connected with a converging portion (45) at which downstream ends of all the exhaust pipes (40a, 40b, 40c, 40d) converge. The exhaust pipes (40a, 40b, 40c, 40d) are each configured as a dual pipe including an outer pipe (50) and an inner pipe (51) disposed inside the outer pipe (50). At the converging portion (45), the four exhaust pipes (40a, 40b, 40c, 40d) are arrayed linearly in parallel with each other, and the outer pipes (50) of adjacent ones of the exhaust pipes (40a, 40b, 40c, 40d) are directly welded with each other at the downstream ends.

In the above configuration, at the downstream ends of the exhaust pipes (40a, 40b, 40c, 40d), outer two of the exhaust pipes (40a, 40d) may be formed to be shorter than central two of the exhaust pipes (40b, 40c), a downstream end of one of the outer pipes (50) may be welded to a downstream end of adjacent one of the outer pipes (50) by a weld (61) provided along a contact portion (56) between the adjacent outer pipes (50), and the weld (61) may include a first weld (61a) that extends in an axial direction of the outer pipes (50), a second weld (61b) that extends in the axial direction of the outer pipes (50) on a back side of the first weld (61a) at the contact portion (56), and a third weld (61c) that connects an end of the first weld (61a) with an end of the second weld (61b) on a side of an end face (63) at the downstream end of the outer pipe (50).

In the above configuration, a downstream end of the inner pipe (51) may have a recess (55) that is recessed to an inside in a radial direction relative to an inner peripheral surface of the outer pipe (50) to thereby form a gap (52a) between an outer peripheral surface of the inner pipe (51) and the inner peripheral surface of the outer pipe (50), and the recess (55) may be disposed at a portion at which the recess (55) crosses an array direction of the exhaust pipes (40a, 40b, 40c, 40d) and overlaps the weld (61).

In the above configuration, the converging exhaust pipe (41) may be disposed so as to cover the downstream ends of the exhaust pipes (40a, 40b, 40c, 40d) from an outside and welded to the exhaust pipes (40a, 40b, 40c, 40d).

In the above configuration, the downstream end of the inner pipe (51) may have an abutment portion (58) that abuts on the inner peripheral surface of the outer pipe (50), the abutment portion (58) being disposed at a portion at which the abutment portion (58) crosses a direction orthogonal to the array direction of the exhaust pipes (40a, 40b, 40c, 40d), and the inner pipe (51) may be welded to the outer pipe (50) at the abutment portion (58).

In the above configuration, the exhaust pipe structure may further include a catalyst apparatus (43) disposed downstream of the converging exhaust pipe (41), the catalyst apparatus (43) purifying exhaust gases, and the catalyst apparatus (43) may include an upstream side catalyst (84) and a downstream side catalyst (86) disposed at a position spaced a distance (S) away in an axial direction of the upstream side catalyst (84) from the upstream side catalyst (84).

In the above configuration, the exhaust pipe structure may further include an exhaust pipe cover (38) that covers the exhaust pipes (40a, 40b, 40c, 40d) from below and lateral sides and, in a front view, the exhaust pipes (40a, 40b, 40c, 40d) may be exposed from the exhaust pipe cover (38).

Effects of the Invention

The exhaust pipe structure for an in-line four-cylinder internal combustion engine includes an in-line four-cylinder internal combustion engine, four exhaust pipes connected with respective exhaust ports in respective cylinders of the internal combustion engine, and a converging exhaust pipe connected with a converging portion at which downstream ends of all the exhaust pipes converge. The exhaust pipes are each configured as a dual pipe including an outer pipe and an inner pipe disposed inside the outer pipe. At the converging portion, the four exhaust pipes are arrayed linearly in parallel with each other, and the outer pipes of adjacent ones of the exhaust pipes are directly welded with each other at the downstream ends.

Through the foregoing configurations, because the exhaust pipes are each a dual pipe, even if the outer pipes are directly welded with each other at the downstream ends, the back beads of the welds can be prevented from affecting the exhaust gas flowing through the inner pipes. Thus, the exhaust pipes can be compactly disposed in an array direction of the exhaust pipes through the direct welding of the outer pipes at the downstream ends. Additionally, the exhaust pipes, because of a dual pipe configuration, can improve a heat retaining property.

In the above configuration, at the downstream ends of the exhaust pipes, outer two of the exhaust pipes may be formed to be shorter than central two of the exhaust pipes, a downstream end of one of the outer pipes may be welded to a downstream end of adjacent one of the outer pipes by a weld provided along a contact portion between the adjacent outer pipes, and the weld may include a first weld that extends in an axial direction of the outer pipes, a second weld that extends in the axial direction of the outer pipes on a back side of the first weld at the contact portion, and a third weld that connects an end of the first weld with an end of the second weld on a side of an end face at the downstream end of the outer pipe.

Through the foregoing configurations, the outer exhaust pipes being shorter than the central exhaust pipes result in the shoulder being formed. The weld can thus be produced so as to use the shoulder as a target, which achieves favorable welding workability. Additionally, the third weld enables welding to be made rigid.

In the above configuration, a downstream end of the inner pipe may have a recess that is recessed to an inside in a radial direction relative to an inner peripheral surface of the outer pipe to thereby form a gap between an outer peripheral surface of the inner pipe and the inner peripheral surface of the outer pipe, and the recess may be disposed at a portion at which the recess crosses an array direction of the exhaust pipes and overlaps the weld.

The foregoing configurations result in the back bead of the weld being located in the recess, so that the weld can be prevented from affecting the flow of the exhaust gas.

In the above configuration, the converging exhaust pipe may be disposed so as to cover the downstream ends of the exhaust pipes from an outside and welded to the exhaust pipes.

Through the foregoing configurations, a part of the exhaust gases that flow in the converging exhaust pipe flows to the space between the outer pipe and the inner pipe through the gap. The part of the exhaust gases flowing in the space between the outer pipe and the inner pipe thus can adjust the exhaust characteristic.

In the above configuration, the downstream end of the inner pipe may have an abutment portion that abuts on the inner peripheral surface of the outer pipe, the abutment portion being disposed at a portion at which the abutment portion crosses a direction orthogonal to the array direction of the exhaust pipes, and the inner pipe may be welded to the outer pipe at the abutment portion.

In the foregoing configurations, because the inner pipe is welded to the outer pipe at the abutment portion disposed at the portion at which the abutment portion crosses the direction orthogonal to the array direction of the exhaust pipes, strength and rigidity of the exhaust pipes can be enhanced in the direction orthogonal to the array direction of the exhaust pipes.

In the above configuration, the exhaust pipe structure may further include a catalyst apparatus disposed downstream of the converging exhaust pipe, the catalyst apparatus purifying exhaust gases, and the catalyst apparatus may include an upstream side catalyst and a downstream side catalyst disposed at a position spaced a distance away in an axial direction of the upstream side catalyst from the upstream side catalyst.

Through the foregoing configuration, the exhaust gas that flows from each of the four exhaust pipes to the upstream side catalyst is mixed with each other during passage through the space between the upstream side catalyst and the downstream side catalyst before flowing to the downstream side catalyst, so that the downstream side catalyst can efficiently purify the exhaust gas.

In the above configuration, the exhaust pipe structure may further include an exhaust pipe cover that covers the exhaust pipes from below and lateral sides and, in a front view, the exhaust pipes may be exposed from the exhaust pipe cover. Through the foregoing configuration, because the exhaust pipes are exposed from the exhaust pipe cover, appearance of the exhaust pipes can enhance a visual appearance property. The exhaust pipes, because of the dual pipe configuration, can prevent flying gravel, for example, from affecting the inner pipe, should the flying gravel hit against the outer pipe that is exposed from the exhaust pipe cover.

BRIEF DESCRIPTION OF THE DRAWINGS

FIG. 9 is a cross-sectional view of an internal structure of a muffler, taken along IX-IX in FIG. 4.

MODE FOR CARRYING OUT THE INVENTION

Figure 1:
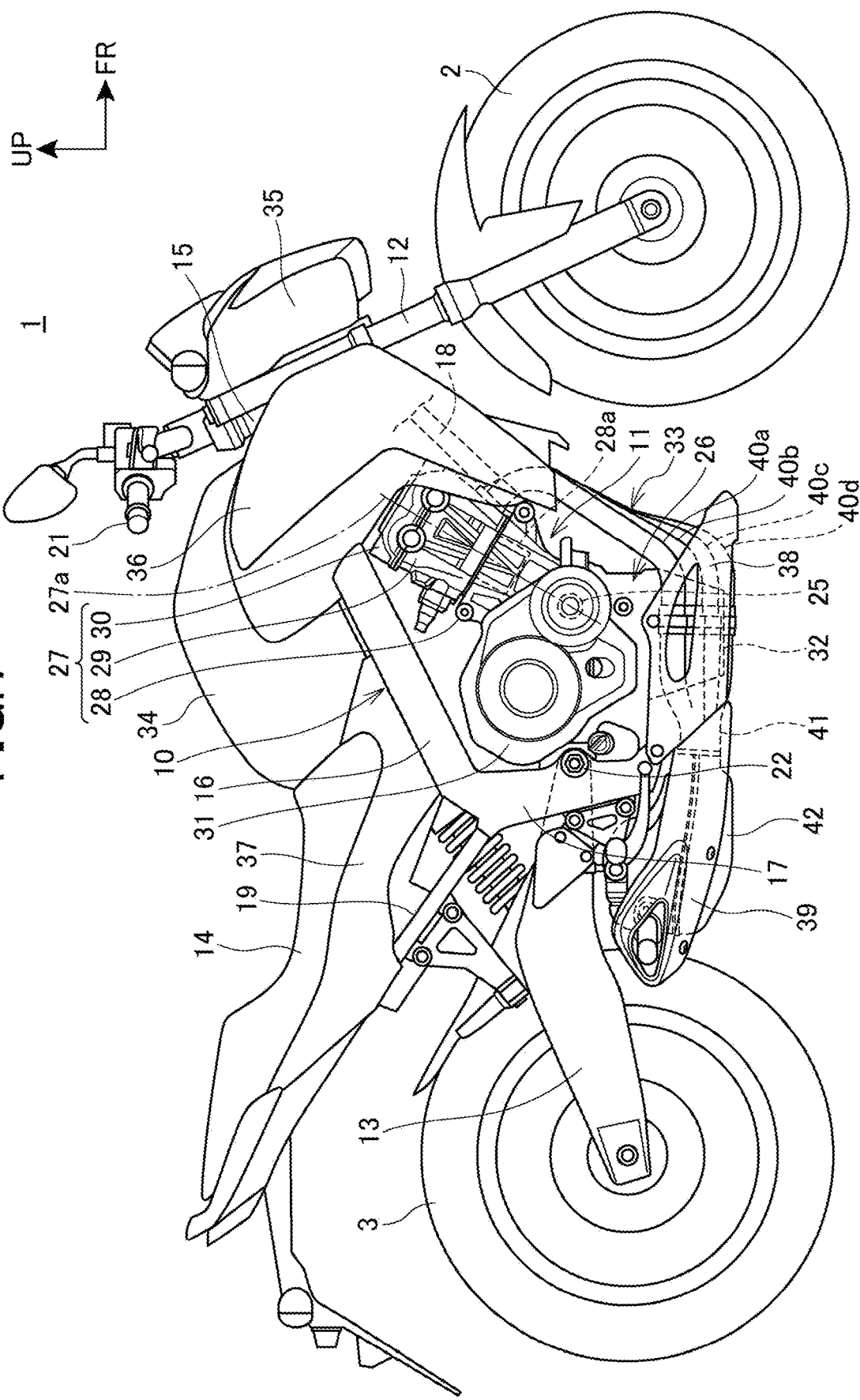
FIG. 1 is a right side elevation view of a motorcycle on which an engine according to an embodiment of the present invention is mounted.

A specific embodiment to which the present invention is applied will be described below with reference to the accompanying drawings. Throughout the descriptions given hereunder, expressions indicating directions including front and rear, right and left, and upper and lower are identical to directions relative to the vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a right side elevation view of a motorcycle 1 on which an engine 11 according to an embodiment of the present invention is mounted.

The motorcycle 1 includes the engine 11, a front fork 12, and a swing arm 13. The engine 11 as a power unit is supported on a vehicle body frame 10. The front fork 12 steerably supports a front wheel 2. The front fork 12 is steerably supported at a front end of the vehicle body frame 10. The swing arm 13 supports a rear wheel 3. The swing arm 13 is disposed on a rear portion side of the vehicle body frame 10.

The motorcycle 1 is a saddle riding vehicle in which an occupant straddles a seat 14. The seat 14 is disposed at a position superior to a rear portion of the vehicle body frame 10.

The vehicle body frame 10 includes a head pipe 15, a pair of left and right main frames 16, a pair of left and right pivot frames 17, a down frame 18, and a pair of left and right seat frames 19. The head pipe 15 is disposed at a front end of the vehicle body frame 10. The main frames 16 extend from the head pipe 15 downwardly toward the rear. The pivot frames 17 extend from rear ends of the main frames 16 downwardly. The down frame 18 extends from the head pipe 15 downwardly toward the rear along a path inferior to the main frames 16. The seat frames 19 extend from rear portions of the main frames 16 and upper portions of the pivot frames 17 upwardly toward the rear.

The front fork 12 is journaled by the head pipe 15 steerably to the left and right. A steering handlebar 21 is disposed at an upper portion of the front fork 12. The front wheel 2 is journaled at a lower end portion of the front fork 12.

The swing arm 13 is journaled by a pivot shaft 22. The pivot shaft 22 is supported by the left and right pivot frames 17. The pivot shaft 22 extends horizontally in a vehicle width direction. The swing arm 13 has a front end portion journaled by the pivot shaft 22. The swing arm 13 is thereby swung vertically about the pivot shaft 22.

The engine 11 is disposed at a position inferior to the main frames 16 and between the down frame 18 and the pivot frames 17 and is fixed to the vehicle body frame 10.

The engine 11 includes a crankcase 26 and a cylinder portion 27. The crankcase 26 supports a crankshaft 25. The crankshaft 25 extends horizontally in the vehicle width direction (lateral direction). The cylinder portion 27 extends from a front portion of the crankcase 26 upwardly.

The cylinder portion 27 includes a cylinder block 28, a cylinder head 29, and a head cover 30. A combustion chamber is defined in the cylinder head 29. The head cover 30 covers a valve-actuating mechanism at an upper portion of the cylinder head 29 from above. The cylinder portion 27 has a cylinder axis 27a. The cylinder axis 27a is inclined forwardly relative to a vertical direction.

An oil pan 32 is disposed at a lower portion of the crankcase 26. The oil pan 32 stores oil.

The cylinder block 28 includes a cylinder bore 28a, in which a piston (not illustrated) is stored. The engine 11 is an in-line four-cylinder internal combustion engine, in which four cylinder bores 28a are arrayed in a row along an axial direction of the crankshaft 25. Specifically, the cylinder portion 27 includes a first cylinder, a second cylinder, a third cylinder, and a fourth cylinder that are arrayed in a row in the vehicle width direction.

The crankcase 26 has a rear portion constituting a transmission case portion 31. The transmission case portion 31 houses a transmission (not illustrated). An output from the engine 11 is transmitted from the transmission to the rear wheel 3 via a drive chain.

An intake apparatus (not illustrated) of the engine 11 is connected with an intake port in a rear surface of the cylinder head 29.

An exhaust apparatus 33 of the engine 11 is connected with an exhaust port in a front surface of the cylinder head 29.

A fuel tank 34 is disposed superior to the main frames 16 and anterior to the seat 14.

The motorcycle 1 includes, as a vehicle body cover, a front cover 35, a front side cover 36, a rear side cover 37, an exhaust pipe cover 38, and a muffler cover 39. The front cover 35 covers an upper portion of the front fork 12 from front. The front side cover 36 covers a front portion of the vehicle body frame 10 from a side. The rear side cover 37 covers an inferior portion of the seat 14.

Figure 2:
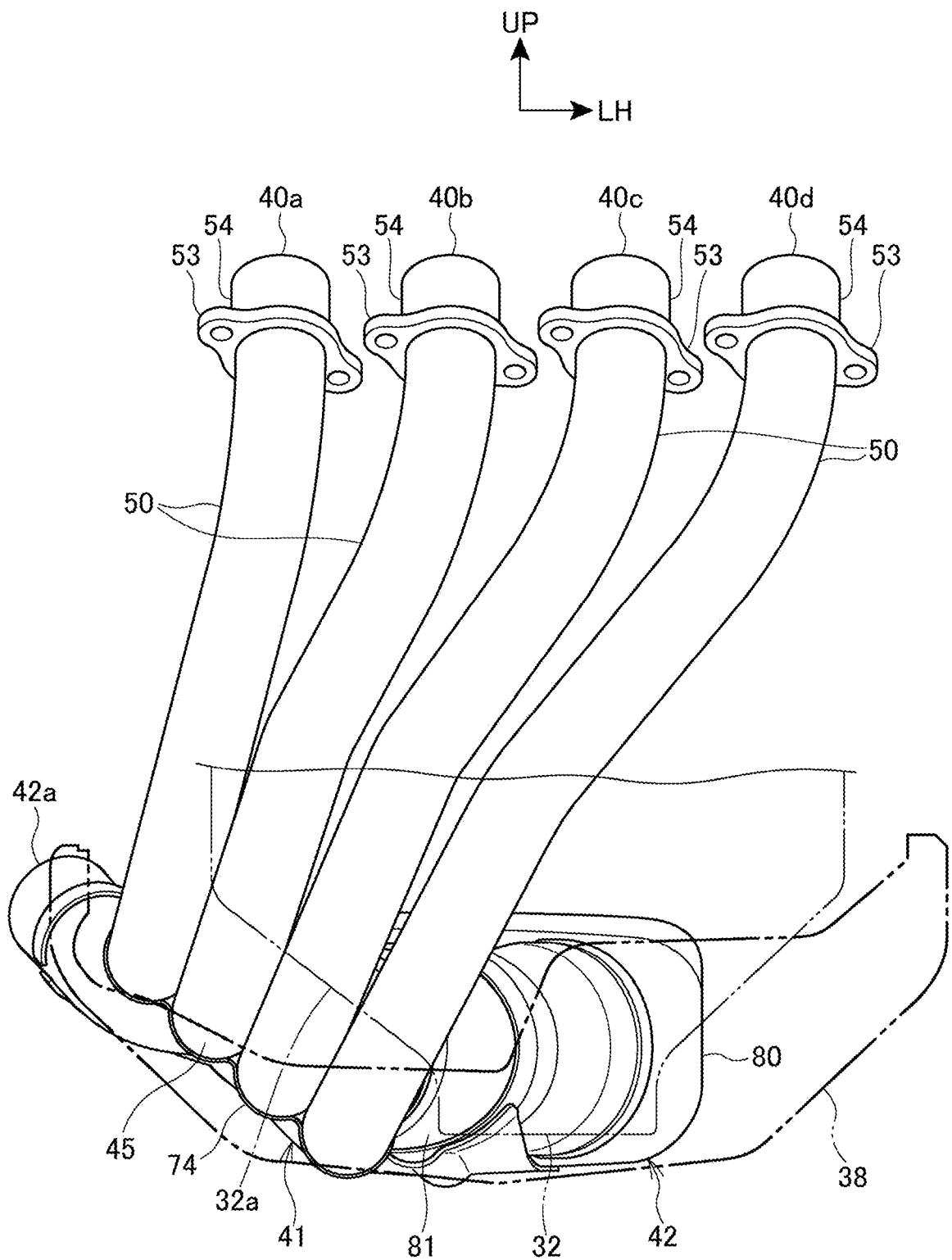
FIG. 2 is a front elevation view of an exhaust apparatus as viewed from an anterior side of the vehicle.
Figure 3:
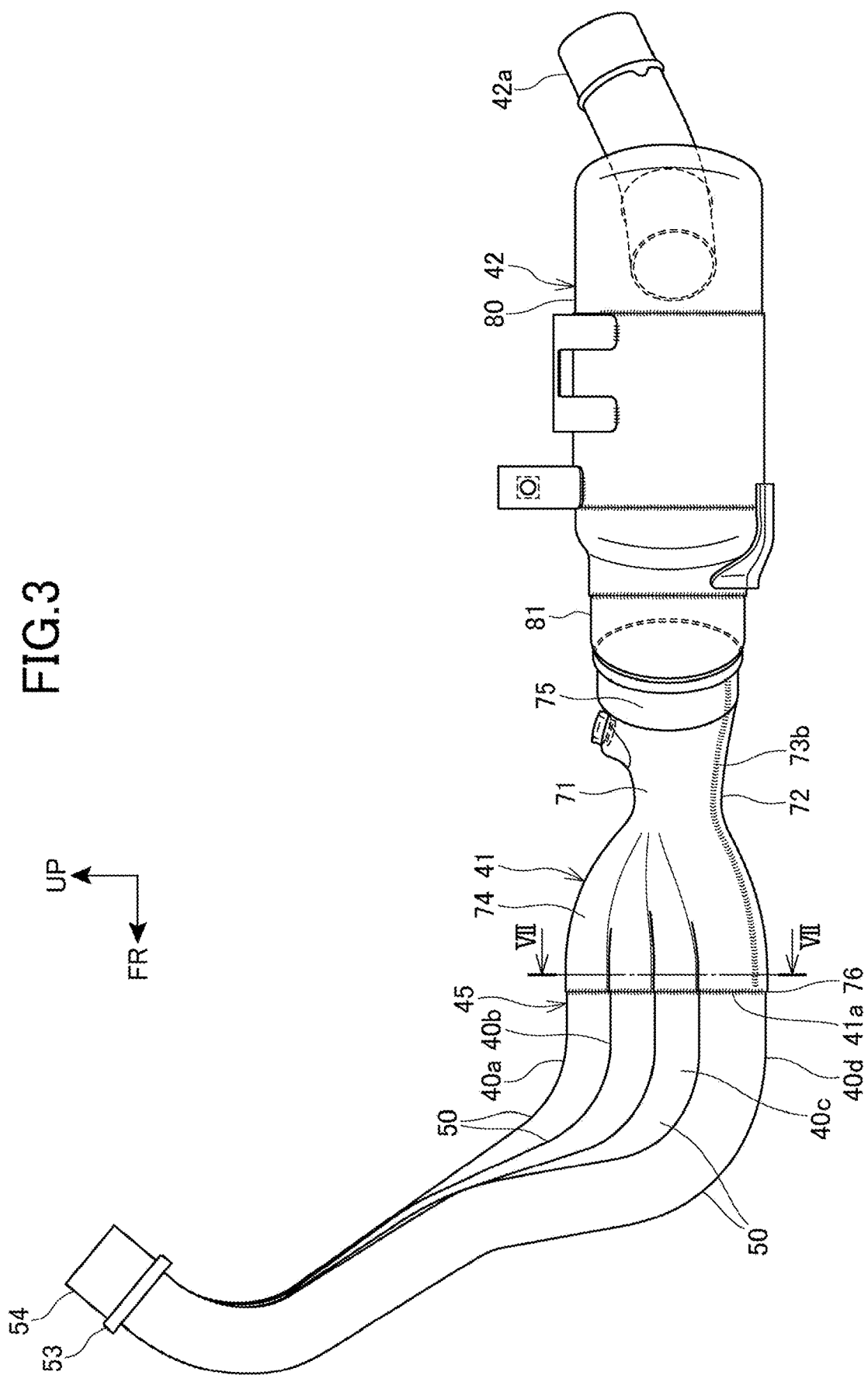
FIG. 3 is a side elevation view of the exhaust apparatus as viewed from a left side.
Figure 4:
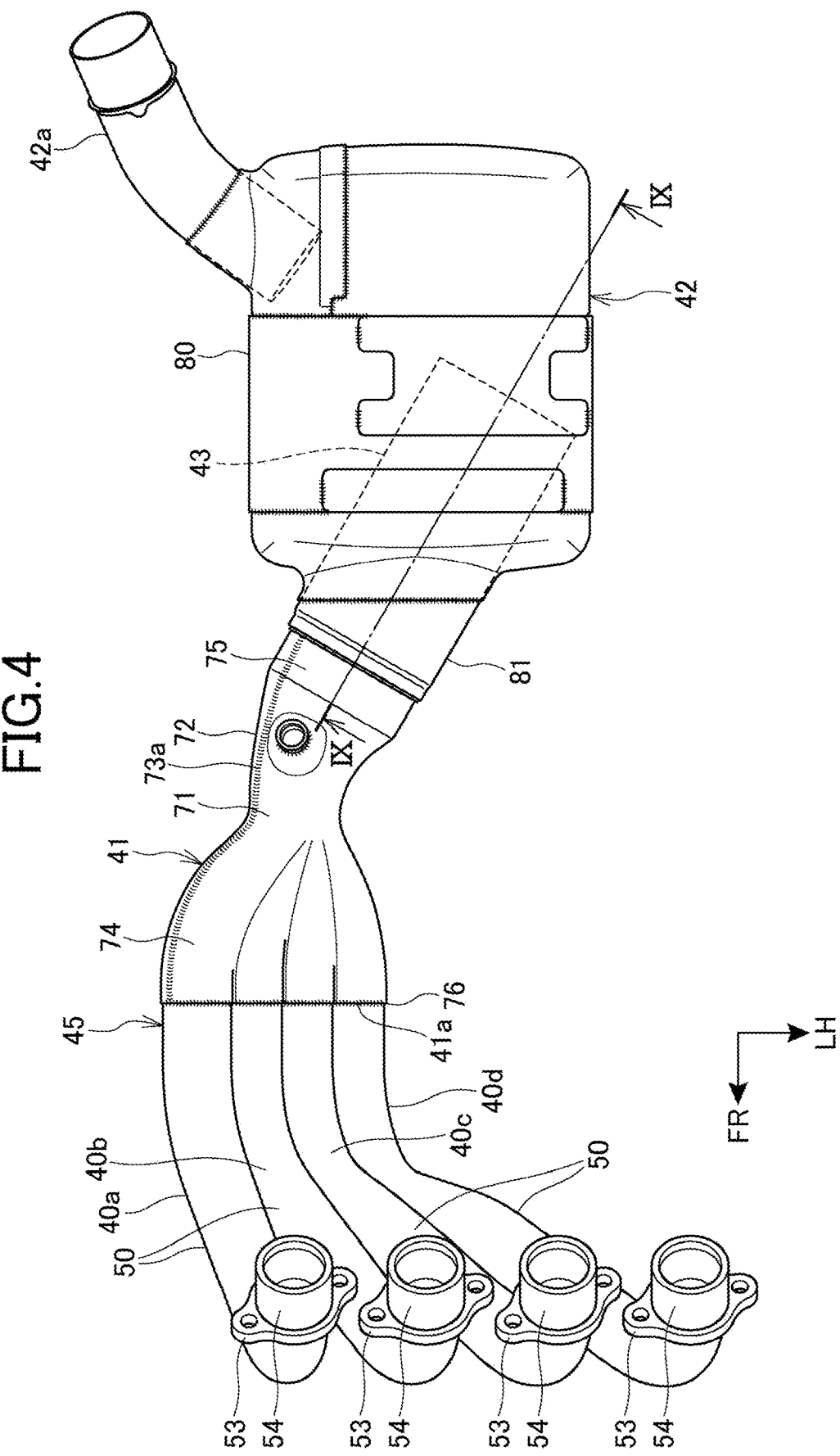
FIG. 4 is a plan view of the exhaust apparatus as viewed from above.

FIG. 2 is a front elevation view of the exhaust apparatus 33 as viewed from an anterior side of the vehicle. FIG. 3 is a side elevation view of the exhaust apparatus 33 as viewed from a left side. FIG. 4 is a plan view of the exhaust apparatus 33 as viewed from above.

Reference is made to FIGS. 1 to 4. The exhaust apparatus 33 includes a plurality of exhaust pipes 40a, 40b, 40c, and 40d, a single converging exhaust pipe 41, a muffler 42, and a catalyst apparatus 43 (FIG. 4). The exhaust pipes 40a, 40b, 40c, and 40d are connected with the cylinder head 29. The converging exhaust pipe 41 is connected with respective downstream ends of the exhaust pipes 40a, 40b, 40c, and 40d. The muffler 42 is connected with a downstream end of the converging exhaust pipe 41. The catalyst apparatus 43 is disposed inside the muffler 42.

The engine 11 has four cylinders. The exhaust port is provided for each cylinder of the cylinder portion 27. The four exhaust pipes 40a, 40b, 40c, and 40d are associated with the respective cylinders.

Specifically, the exhaust pipe 40a is connected with the exhaust port of the first cylinder disposed on a lateral first side (right side) of the cylinder portion 27.

The exhaust pipe 40b is connected with the exhaust port of the second cylinder adjacent to the first cylinder.

The exhaust pipe 40c is connected with the exhaust port of the third cylinder adjacent to the second cylinder.

The exhaust pipe 40d is connected with the exhaust port of the fourth cylinder disposed on a lateral second side (left side) of the cylinder portion 27.

The exhaust pipes 40a, 40b, 40c, and 40d extend from the front surface of the cylinder portion 27 downwardly toward the rear and toward the lateral first side so as to follow along the front surface of the engine 11. The exhaust pipes 40a, 40b, 40c, and 40d then extend along a path inferior to the engine 11 toward the rear.

The exhaust apparatus 33 includes a converging portion 45. The converging portion 45 is disposed on the side of the downstream ends of the four exhaust pipes 40a, 40b, 40c, and 40d. The four exhaust pipes 40a, 40b, 40c, and 40d converge at the converging portion 45.

The converging portion 45 is disposed inferior to the engine 11 and on an outer lateral side of the oil pan 32. The converging portion 45 is offset on the lateral first side with reference to a center in a vehicle width.

The oil pan 32 has a side surface 32a. In the front view of FIG. 2, the side surface 32a is inclined so as to be disposed at lower positions at distances closer toward the inside in the vehicle width direction.

The converging portion 45 is disposed to be inclined along the side surface 32a of the oil pan 32.

Specifically, the exhaust pipes 40a, 40b, 40c, and 40d are arrayed such that, at the converging portion 45, the exhaust pipe 40a is disposed on the outermost end in the vehicle width direction and superiorly and the exhaust pipes 40b, 40c, and 40d are disposed in sequence on inner sides in the vehicle width direction and more inferiorly. The disposition of the converging portion 45 along the inclined side surface 32a of the oil pan 32 enables the exhaust pipes 40a, 40b, 40c, and 40d to be compactly disposed.

The converging exhaust pipe 41 is connected with the converging portion 45 of the exhaust pipes 40a, 40b, 40c, and 40d.

In a top view of FIG. 4, the converging exhaust pipe 41 is inclined so as to be located more on the central side in the vehicle width at distances closer to the rear side. The converging exhaust pipe 41 is located inferior to a rear portion of the crankcase 26.

The exhaust pipe cover 38 covers the exhaust pipes 40a, 40b, 40c, and 40d from below and lateral sides. Specifically, as illustrated in FIGS. 1 and 2, the converging portion 45 and the converging exhaust pipe 41 are covered in the exhaust pipe cover 38 from below, both lateral sides, and front. The exhaust pipe cover 38 does not cover a superior portion of the converging portion 45 in the exhaust pipes 40a, 40b, 40c, and 40d from front and the superior portion of the converging portion 45 is exposed to the front in the vehicle front view of FIG. 2.

The muffler 42 is formed into a box shape and includes thereinside an expansion chamber for reducing exhaust noise. The muffler 42 includes a tailpipe 42a. The tailpipe 42a extends toward the rear from a side surface on the first lateral side. The exhaust gas is discharged to the outside from the tailpipe 42a.

The muffler 42 is disposed posterior to the engine 11 and inferior to a front portion of the swing arm 13. The muffler 42 is disposed at a center in the vehicle width.

The muffler 42 is covered in the muffler cover 39 (FIG. 1) from a side.

Figure 5:
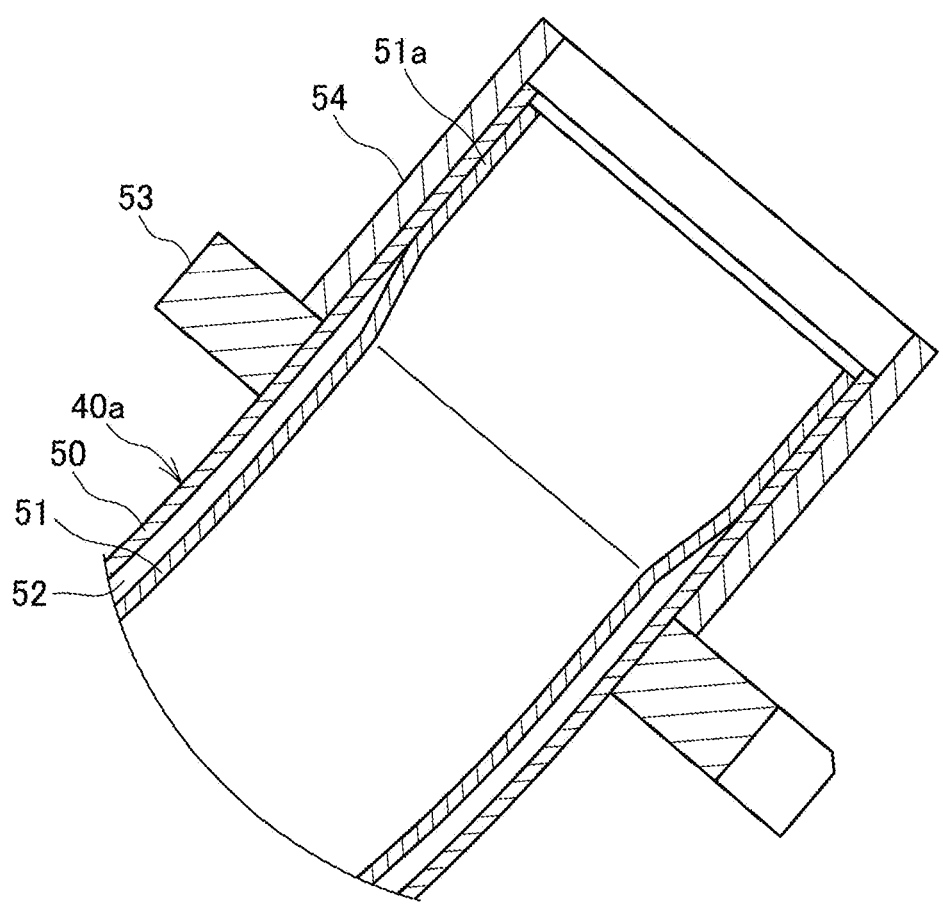
FIG. 5 is a cross-sectional view of an upstream end of an exhaust pipe.

FIG. 5 is a cross-sectional view of an upstream end of the exhaust pipe 40a. The exhaust pipes 40b, 40c, and 40d are each also configured as illustrated in FIG. 5.

The exhaust pipes 40a, 40b, 40c, and 40d are each configured as a dual pipe including an outer pipe 50 and an inner pipe 51 which is disposed inside the outer pipe 50. The outer pipe 50 is disposed coaxially with the inner pipe 51. An annular space 52 is formed between an inner peripheral surface of the outer pipe 50 and an outer peripheral surface of the inner pipe 51. The space 52 is formed to extend along a substantially entire length of each of the exhaust pipes 40a, 40b, 40c, and 40d.

The inner pipe 51 has an enlarged diameter portion 51a at the upstream end of each of the exhaust pipes 40a, 40b, 40c, and 40d. The enlarged diameter portion 51a abuts on the inner peripheral surface of the outer pipe 50. The enlarged diameter portion 51a being connected with the inner peripheral surface of the outer pipe 50 results in a first end of the space 52 in the axial direction of each of the exhaust pipes 40a, 40b, 40c, and 40d being closed.

A flange portion 53 and a connection pipe 54 are disposed at the upstream end of each of the exhaust pipes 40a, 40b, 40c, and 40d. The flange portion 53 protrudes from the outer pipe 50 to the outside in a radial direction. The connection pipe 54 is fitted over an outer peripheral surface of the outer pipe 50 at a position upstream of the flange portion 53.

The connection pipe 54 is fitted to the exhaust port and the upstream end of each of the exhaust pipes 40a, 40b, 40c, and 40d is fastened to the front surface of the cylinder head 29 by a bolt passed through the flange portion 53.

Figure 6:
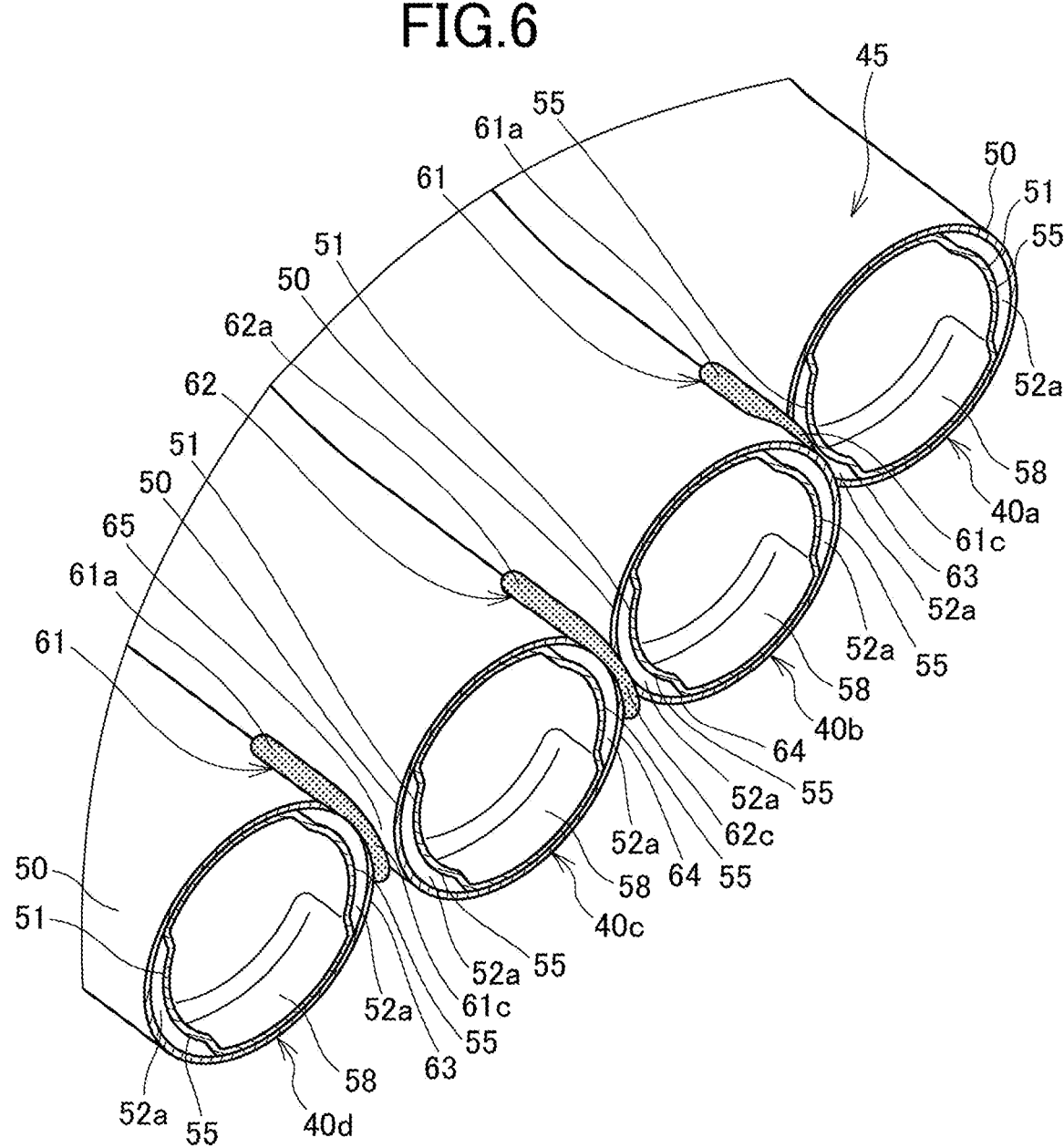
FIG. 6 is a perspective view of downstream ends of exhaust pipes as viewed from a posterior side.
Figure 7:
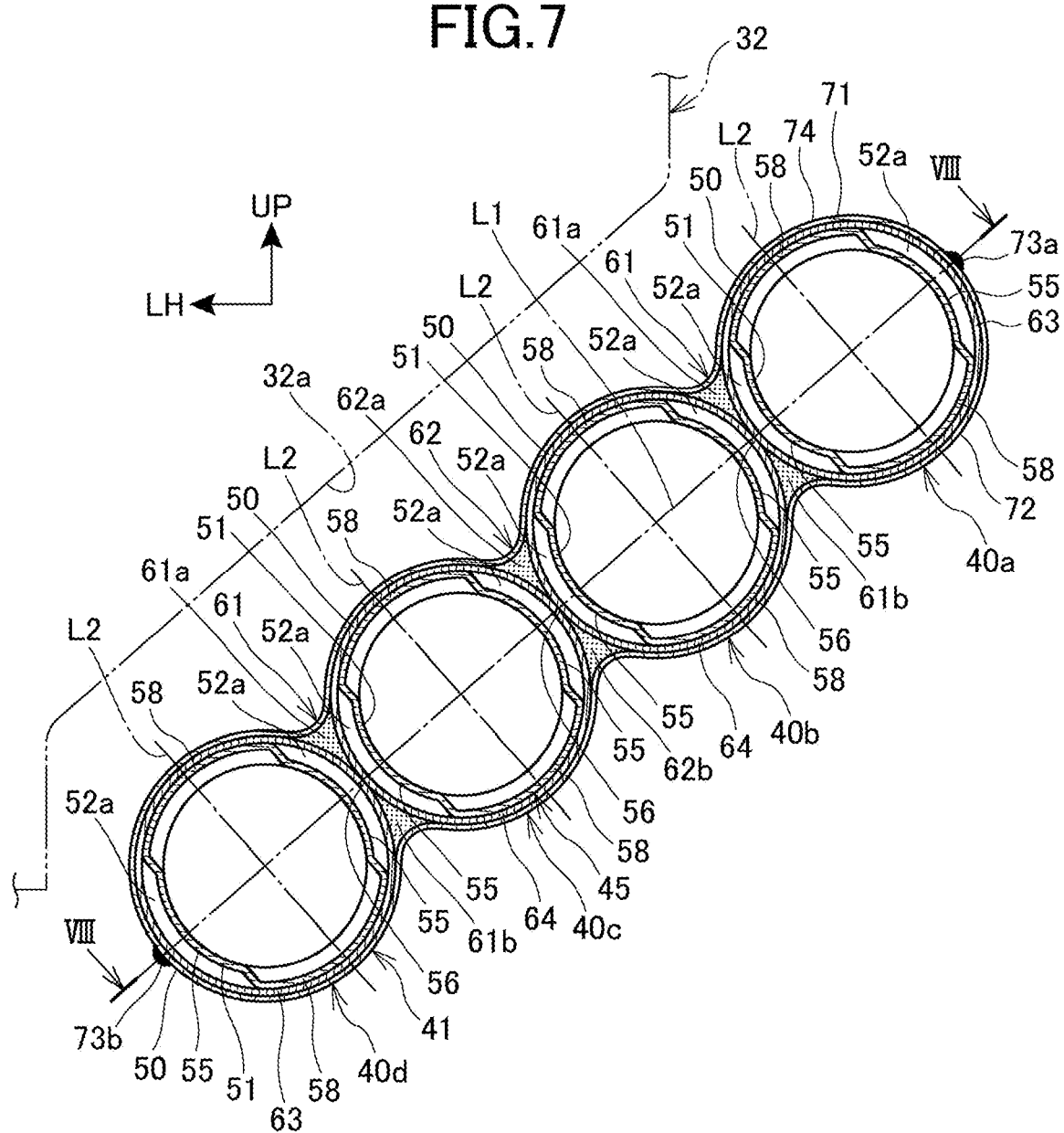
FIG. 7 is a cross-sectional view of a converging portion, taken along VII-VII in FIG. 3.
Figure 8:
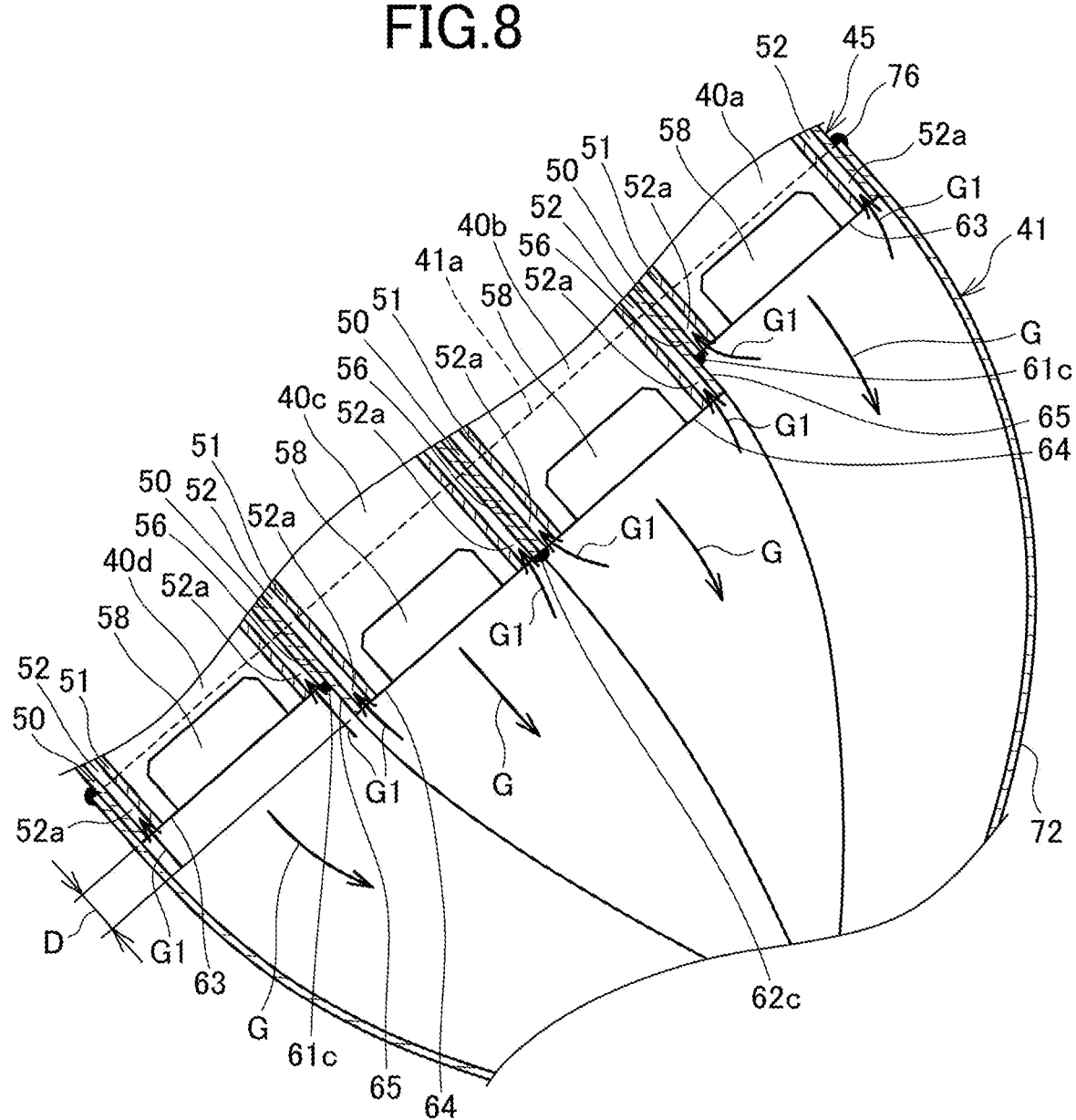
FIG. 8 is a cross-sectional view taken along VIII-VIII in FIG. 7.

FIG. 6 is a perspective view of the downstream ends of the exhaust pipes 40a, 40b, 40c, and 40d as viewed from a posterior side. FIG. 7 is a cross-sectional view of the converging portion 45, taken along VII-VII in FIG. 3. FIG. 8 is a cross-sectional view taken along VIII-VIII in FIG. 7.

At the converging portion 45, the exhaust pipes 40a, 40b, 40c, and 40d are arrayed in parallel linearly in an axial direction view of the exhaust pipes 40a, 40b, 40c, and 40d. The exhaust pipes 40a, 40b, 40c, and 40d each have an outside diameter substantially identical to each other.

Specifically, at the converging portion 45, the exhaust pipes 40a, 40b, 40c, and 40d are arrayed in a straight line along a virtual straight arrangement line L1 (FIG. 7) which extends substantially in parallel with the side surface 32a of the oil pan 32. The exhaust pipes 40a, 40b, 40c, and 40d each have a center disposed on the straight arrangement line L1.

Reference is made to FIGS. 6 to 8. At a downstream end of the inner pipe 51, a pair of recesses 55 and a pair of abutment portions 58 are disposed. The recesses 55 are recessed to the inside in the radial direction relative to the inner peripheral surface of the outer pipe 50 to thereby form gaps 52a. The gaps 52a are defined between the outer peripheral surface of the inner pipe 51 and the inner peripheral surface of the outer pipe 50. At the abutment portions 58, the outer peripheral surface of the inner pipe 51 abuts on the inner peripheral surface of the outer pipe 50.

The recesses 55 are disposed to face each other on the circumference of the inner pipe 51 and to cross the straight arrangement line L1.

The gaps 52a constitute a rear end portion of the space 52.

Reference is made to FIGS. 6 and 8. Out of the exhaust pipes 40a, 40b, 40c, and 40d, the two exhaust pipes 40a and 40d, which are disposed on the outside in the array, are formed to be shorter by a distance D in the axial direction than the two exhaust pipes 40b and 40c, which are disposed centrally in the array, at the downstream ends of the exhaust pipes 40a, 40b, 40c, and 40d. Specifically, end faces 64 on the downstream side of the central two exhaust pipes 40b and 40c protrude toward the downstream side in an exhaust flow relative to end faces 63 on the downstream side of the outer two exhaust pipes 40a and 40d. The foregoing results in a shoulder 65 being formed between the end face 63 and the end face 64.

At the converging portion 45, adjacent outer pipes 50 in the exhaust pipes 40a, 40b, 40c, and 40d contact each other and the two adjacent outer pipes 50 are connected with each other by welds 61 and 62 which are disposed at contact portions 56. The welds 61 and 62 are weld beads.

The welds 61 are disposed between the exhaust pipe 40a and the exhaust pipe 40b, and between the exhaust pipe 40c and the exhaust pipe 40d. The weld 62 is disposed between the exhaust pipe 40b and the exhaust pipe 40c.

The weld 61 includes a first weld 61a, a second weld 61b, and a third weld 61c. The first weld 61a extends in the axial direction of the outer pipes 50 between the two adjacent outer pipes 50. The second weld 61b extends in the axial direction of the outer pipes 50 on the back side of the first weld 61a across the contact portion 56. The third weld 61c connects an end of the first weld 61a with an end of the second weld 61b on the side of the end face 63 downstream of each of the shorter exhaust pipes 40a and 40d.

The third weld 61c welds the outer peripheral surface of the outer pipe 50 of each of the longer exhaust pipes 40b and 40c with the end face 63 of each of the shorter exhaust pipes 40a and 40d.

The first weld 61a, the second weld 61b, and the third weld 61c of the weld 61 are formed into a C-shape opening to the upstream side in the exhaust flow.

The weld 62 includes a first weld 62a, a second weld 62b, and a third weld 62c. The first weld 62a extends between the outer pipes 50 of the adjacent exhaust pipes 40b and 40c in the axial direction of the outer pipes 50. The second weld 62b extends in the axial direction of the outer pipes 50 on the back side of the first weld 62a across the contact portion 56. The third weld 62c connects an end of the first weld 62a with an end of the second weld 62b on the side of the end faces 64 downstream of the exhaust pipes 40b and 40c.

The first weld 62a, the second weld 62b, and the third weld 62c of the weld 62 are formed into a C-shape opening to the upstream side in the exhaust flow.

All of the exhaust pipes 40a, 40b, 40c, and 40d are disposed in such an orientation that the recesses 55 cross the straight arrangement line L1. Thus, each of the contact portions 56 is sandwiched between the recesses 55 which are located on both lateral sides of the contact portion 56. The gaps 52a formed by the recesses 55 overlap the contact portion 56. Additionally, the gaps 52a are provided to extend over a range overlapping the first weld 61a and the second weld 61b in the circumferential direction of the outer pipe 50. Furthermore, the third weld 61c overlaps the gap 52a in each of the longer exhaust pipes 40b and 40c.

Additionally, the weld 62 overlaps the gaps 52a in the longer exhaust pipes 40b and 40c.

Because the exhaust pipes 40a, 40b, 40c, and 40d are each a dual pipe, the space 52 can be used as a heat insulating layer and a high heat retaining property can be achieved for the exhaust gas. The exhaust gas can thus be quickly heated and the catalyst apparatus 43 can be activated for the efficient purification of the exhaust gas.

The welds 61 and the weld 62 are provided at portions overlapping the gaps 52a in the outer pipes 50. Thus, should back beads occur in the welds 61 and the weld 62, the back beads are located in the gaps 52a. The foregoing arrangement prevents the back beads from affecting the inside of the inner pipe 51, through which the exhaust gas flows, so that the exhaust gas can be made to flow efficiently. The gap 52a, which constitutes a part of the space 52 in the dual pipe, can be readily provided.

In the present embodiment, because the back beads in the welds 61 and the weld 62 can be prevented from affecting the inside of the inner pipes 51, the outer pipes 50 can be welded together at the welds 61 and 62 through direct contact at the contact portions 56. The foregoing feature enables the exhaust pipes 40a, 40b, 40c, and 40d to be compactly arrayed in the direction of the straight arrangement line L1.

The inner pipe 51 is connected with the outer pipe 50 by the abutment portions 58 being welded to the inner peripheral surface of the outer pipe 50. The abutment portions 58 are disposed at positions at which the abutment portions 58 cross an orthogonal straight line L2 which passes through a center of each of the exhaust pipes 40a, 40b, 40c, and 40d and which is substantially orthogonal to the straight arrangement line L1. The abutment portions 58 face each other on a circumference of the inner pipe 51.

In the exhaust pipes 40a, 40b, 40c, and 40d, the outer pipes 50 are welded in the direction of the straight arrangement line L1 by the welds 61 and 62 and the outer pipes 50 are welded to the inner pipes 51 in the direction of the orthogonal straight line L2. The foregoing arrangements increase strength and rigidity of the exhaust pipes 40a, 40b, 40c, and 40d in the directions of the straight arrangement line L1 and the orthogonal straight line L2. Specifically, the strength and rigidity can be effectively enhanced.

Reference is made to FIGS. 3, 4, 7, and 8. The converging exhaust pipe 41 is formed into a pipe shape extending in a fore-aft direction by a first half body 71 being connected with a second half body 72. The first half body 71 covers the downstream end of the converging portion 45 from above. The second half body 72 covers the downstream end of the converging portion 45 from below.

Weld beads 73a and 73b join the first half body 71 with the second half body 72. The weld beads 73a and 73b are provided on both side surfaces of the converging exhaust pipe 41 and extend in the fore-aft direction along the side surfaces.

A flat portion 74 is disposed at an upstream portion of the converging exhaust pipe 41. The flat portion 74 is connected with the downstream end of the converging portion 45. The flat portion 74 has an external shape of a flat pipe to correspond with the shape of the converging portion 45.

A muffler connection 75 is disposed at a downstream portion of the converging exhaust pipe 41. The muffler connection 75 is a pipe formed into a substantially circular outline.

The converging exhaust pipe 41 is provided so as to cover the downstream end of the converging portion 45 from the outside and joined to the outer peripheral surface of the converging portion 45 by a weld bead 76. The weld bead 76 extends along a peripheral edge portion 41a at the upstream end of the converging exhaust pipe 41.

Specifically, the converging exhaust pipe 41 is welded to the outer peripheral surfaces of the outer pipes 50 of the exhaust pipes 40a, 40b, 40c, and 40d by the weld bead 76. The weld bead 76 overlaps the space 52 from the outside.

The welds 61 and 62 of the converging portion 45 are covered in the converging exhaust pipe 41 and hidden inside the converging exhaust pipe 41.

An exhaust passage inside the converging exhaust pipe 41 communicates with the space 52 in each of the exhaust pipes 40a, 40b, 40c, and 40d via the gap 52a in the converging portion 45. Specifically, a second end of the space 52 in the axial direction of each of the exhaust pipes 40a, 40b, 40c, and 40d communicates with the inside of the converging exhaust pipe 41 via the gap 52a.

Exhaust gases from the exhaust ports in the cylinder head 29 of the engine 11 pass through the exhaust pipes 40a, 40b, 40c, and 40d and join in the single exhaust passage inside the converging exhaust pipe 41, before being discharged to the outside from the tailpipe 42a of the muffler 42 by way of the catalyst apparatus 43 inside the muffler 42.

A part G1 of the exhaust gases G, which flow in the converging exhaust pipe 41, flows to the spaces 52 in the exhaust pipes 40a, 40b, 40c, and 40d through the gaps 52a as illustrated in FIG. 8. The part G1 of the exhaust gases G flowing in the spaces 52 adjusts an exhaust characteristic of the exhaust gas flowing through the exhaust apparatus 33. Accordingly, by changing disposition and shape of the gap 52a, an output characteristic and an exhaust noise characteristic of the engine 11 can be adjusted.

FIG. 9 is a cross-sectional view of an internal structure of the muffler 42, taken along IX-IX in FIG. 4.

The muffler 42 includes an outer tube 80 and an inner tube 81. The outer tube 80 constitutes an outer shell of the muffler 42. The inner tube 81 is disposed inside the outer tube 80.

The inner tube 81 is fitted in an opening 80a in a front end portion of the outer tube 80. The inner tube 81 has an upstream end protruding from the opening 80a to the front.

The inner tube 81 has a rear end located inside the outer tube 80. The rear end of the inner tube 81 is supported by a support member 83. The support member 83 connects an outer peripheral portion of the inner tube 81 with an inner peripheral portion of the outer tube 80.

The catalyst apparatus 43 includes an upstream side catalyst 84, an upstream side holding tube 85, a downstream side catalyst 86, and a downstream side holding tube 87. The upstream side holding tube 85 holds the upstream side catalyst 84. The downstream side catalyst 86 is disposed downstream of the upstream side catalyst 84. The downstream side holding tube 87 holds the downstream side catalyst 86.

The upstream side holding tube 85 has a diameter substantially identical to a diameter of the downstream side holding tube 87 and is disposed coaxially with the downstream side holding tube 87. The upstream side holding tube 85 is joined with the downstream side holding tube 87 by a weld bead 89. An abutment portion 88 between a downstream end of the upstream side holding tube 85 and an upstream end of the downstream side holding tube 87 is welded by the weld bead 89.

The catalyst apparatus 43 is supported in the inner tube 81 by the upstream side holding tube 85 and the downstream side holding tube 87 being fitted in an inner peripheral surface of the inner tube 81.

The muffler 42 is connected with the converging exhaust pipe 41 under a condition in which a downstream end of the muffler connection 75 of the converging exhaust pipe 41 is fitted in an inner peripheral surface of an upstream end of the upstream side holding tube 85.

The upstream side catalyst 84 and the downstream side catalyst 86 are each a honeycomb-shaped porous structure having a plurality of pores extending in an axial direction inside a cylindrical outer shell. A catalyst (e.g., platinum, rhodium, and palladium) that decomposes exhaust gas components is supported on a wall of each of the pores.

The upstream side catalyst 84 is supported by being fitted in an inner peripheral surface of the upstream side holding tube 85. The upstream side catalyst 84 is offset upstream of the abutment portion 88 in the exhaust flow.

The downstream side catalyst 86 is supported by being fitted in an inner peripheral surface of the downstream side holding tube 87. The downstream side catalyst 86 is offset downstream of the abutment portion 88 in the exhaust flow.

Specifically, the upstream side catalyst 84 and the downstream side catalyst 86 are disposed inside the inner tube 81 with a distance S interposed therebetween in the axial direction of the upstream side catalyst 84.

The exhaust gas G, which flows from each of the exhaust pipes 40a, 40b, 40c, and 40d to the upstream side catalyst 84, can be mixed with each other during passage through a space of the distance S. As a result, the exhaust gas flowing to the downstream side catalyst 86 downstream of the space of the distance S can be made uniform, so that the downstream side catalyst 86 can efficiently purify the exhaust gas.

As described above, in accordance with the embodiment to which the present invention is applied, the exhaust pipe structure for the engine 11 includes: the engine 11; the four exhaust pipes 40a, 40b, 40c, and 40d which are connected with the respective exhaust ports in the respective cylinders of the engine 11; and the converging exhaust pipe 41 which is connected with the converging portion 45 at which the downstream ends of all the exhaust pipes 40a, 40b, 40c, and 40d converge. The exhaust pipes 40a, 40b, 40c, and 40d are each configured as a dual pipe including the outer pipe 50 and the inner pipe 51 which is disposed inside the outer pipe 50. At the converging portion 45, the four exhaust pipes 40a, 40b, 40c, and 40d are arrayed linearly in parallel with each other, and the outer pipes 50 of the adjacent exhaust pipes, specifically, the outer pipes 50 of the exhaust pipes 40a and 40b, the exhaust pipes 40b and 40c, and the exhaust pipes 40c and 40d are directly welded with each other at the downstream ends thereof.

Through the foregoing configurations, because the exhaust pipes 40a, 40b, 40c, and 40d are each a dual pipe, even if the outer pipes 50 are directly welded with each other at the downstream ends, the back beads of the welds can be prevented from affecting the exhaust gas flowing through the inner pipes 51. Thus, the exhaust pipes 40a, 40b, 40c, and 40d can be compactly disposed in the array direction of the exhaust pipes 40a, 40b, 40c, and 40d through the direct welding of the outer pipes 50 at the downstream ends. Additionally, the exhaust pipes 40a, 40b, 40c, and 40d, because of a dual pipe configuration, can improve a heat retaining property.

At the downstream ends of the exhaust pipes 40a, 40b, 40c, and 40d, the outer two exhaust pipes 40a and 40d are formed to be shorter than the central two exhaust pipes 40b and 40c, and the downstream end of one of the outer pipes 50 is welded to the downstream end of adjacent one of the outer pipes 50 by the weld 61 provided along the contact portion 56 between the adjacent outer pipes 50. The welds 61 each include the first weld 61a which extends in the axial direction of the outer pipes 50, the second weld 61b which extends in the axial direction of the outer pipes 50 on the back side of the first weld 61a at the contact portion 56, and the third weld 61c which connects the end of the first weld 61a with the end of the second weld 61b on the side of the end face 63 at the downstream end of the outer pipe 50.

Through the foregoing configurations, the outer exhaust pipes 40a and 40d being shorter than the central exhaust pipes 40b and 40c result in the shoulder 65 being formed. The weld 61 can thus be produced so as to use the shoulder 65 as a target, which achieves favorable welding workability. Additionally, the third weld 61c extends a weld length, so that welding can be made rigid.

The inner pipe 51 has, at the downstream end thereof, the recess 55 which is recessed to the inside in the radial direction relative to the inner peripheral surface of the outer pipe 50 to thereby form the gap 52a between the outer peripheral surface of the inner pipe 51 and the inner peripheral surface of the outer pipe 50. The recesses 55 are disposed at portions at which the recesses 55 cross the array direction of the exhaust pipes 40a, 40b, 40c, and 40d. The recesses 55 overlap the welds 61. The foregoing configurations result in the back beads of the welds 61 being located in the recesses 55, so that the welds 61 can be prevented from affecting the exhaust gas flow through the inner pipe 51.

The converging exhaust pipe 41 is disposed so as to cover the downstream ends of the exhaust pipes 40a, 40b, 40c, and 40d from the outside and welded to the exhaust pipes 40a, 40b, 40c, and 40d.

Through the foregoing configurations, the part G1 of the exhaust gases G, which flow in the converging exhaust pipe 41, flows to the space between the outer pipe 50 and the inner pipe 51 through the gap 52a. The part G1 of the exhaust gases G flowing in the space between the outer pipe 50 and the inner pipe 51 thus can adjust the exhaust characteristic.

Additionally, the abutment portions 58, which abut on the inner peripheral surface of the outer pipe 50, are disposed at the downstream end of the inner pipe 51. The abutment portions 58 are disposed at portions at which the abutment portions 58 cross a direction orthogonal to the array direction of the exhaust pipes 40a, 40b, 40c, and 40d. The inner pipe 51 is welded to the outer pipe 50 at the abutment portions 58.

In the foregoing configurations, because the inner pipe 51 is welded to the outer pipe 50 at the abutment portions 58, which are disposed at the portions at which the abutment portions 58 cross the direction orthogonal to the array direction of the exhaust pipes 40a, 40b, 40c, and 40d, strength and rigidity of the exhaust pipes 40a, 40b, 40c, and 40d can be enhanced in the direction orthogonal to the array direction of the exhaust pipes 40a, 40b, 40c, and 40d.

The catalyst apparatus 43, which purifies the exhaust gas, is disposed downstream of the converging exhaust pipe 41. The catalyst apparatus 43 includes the upstream side catalyst 84 and the downstream side catalyst 86 which is disposed at a position spaced the distance S away in the axial direction of the upstream side catalyst 84 from the upstream side catalyst 84.

Through the foregoing configuration, the exhaust gas that flows from each of the four exhaust pipes 40a, 40b, 40c, and 40d to the upstream side catalyst 84 is mixed with each other during passage through the space between the upstream side catalyst 84 and the downstream side catalyst 86 before flowing to the downstream side catalyst 86, so that the downstream side catalyst 86 can efficiently purify the exhaust gas.

Additionally, the exhaust pipe cover 38 is provided for covering the exhaust pipes 40a, 40b, 40c, and 40d from below and lateral sides. In a vehicle front view, the exhaust pipes 40a, 40b, 40c, and 40d are exposed from the exhaust pipe cover 38. Through the foregoing configuration, because the exhaust pipes 40a, 40b, 40c, and 40d are exposed from the exhaust pipe cover 38, appearance of the exhaust pipes 40a, 40b, 40c, and 40d can enhance a visual appearance property. The exhaust pipes 40a, 40b, 40c, and 40d, because of the dual pipe configuration, can prevent flying gravel, for example, from affecting the inner pipe 51, should the flying gravel hit against the outer pipe 50 which is exposed from the exhaust pipe cover 38. Thus, favorable exhaust characteristics can be maintained.

While the present invention has been particularly described with reference to the specific embodiment, it will be understood that the embodiment is illustrative only and is not intended to limit the present invention.

While the motorcycle 1 exemplifies the saddle riding vehicle, in which the engine 11 is mounted, in the embodiment described above, the invention is not limited thereto. The invention is also applicable to three-wheel saddle riding vehicles including two front or rear wheels, four-or-more-wheel saddle riding vehicles, and other types of vehicles.

DESCRIPTION OF REFERENCE SYMBOLS

11: Engine (in-line four-cylinder internal combustion engine)
38: Exhaust pipe cover
40a: Exhaust pipe (two outer exhaust pipes)
40b: Exhaust pipe (two central exhaust pipes)
40c: Exhaust pipe (two central exhaust pipes)
40d: Exhaust pipe (two outer exhaust pipes)
41: Converging exhaust pipe
43: Catalyst apparatus
45: Converging portion
50: Outer pipe
51: Inner pipe
52a: Gap
55: Recess
56: Contact portion
58: Abutment portion
61: Weld
61a: First weld
61b: Second weld
61c: Third weld
63: End face
84: Upstream side catalyst
86: Downstream side catalyst
S: Distance

The invention claimed is:

1. An exhaust pipe structure for an in-line four-cylinder internal combustion engine, comprising:
    an in-line four-cylinder internal combustion engine;
    four exhaust pipes connected with respective exhaust ports in respective cylinders of the internal combustion engine; and
    a converging exhaust pipe connected with a converging portion at which downstream ends of all the exhaust pipes converge, wherein
    the exhaust pipes are each configured as a dual pipe including an outer pipe and an inner pipe disposed inside the outer pipe, and
    at the converging portion, the four exhaust pipes are arrayed linearly in parallel with each other, and the outer pipes of adjacent ones of the exhaust pipes are directly welded with each other at the downstream ends.

2. The exhaust pipe structure for an in-line four-cylinder internal combustion engine according to claim 1, wherein
    at the downstream ends of the exhaust pipes, outer two of the exhaust pipes are formed to be shorter than central two of the exhaust pipes,
    a downstream end of one of the outer pipes is welded to a downstream end of adjacent one of the outer pipes by a weld provided along a contact portion between the adjacent outer pipes, and
    the weld includes a first weld that extends in an axial direction of the outer pipes, a second weld that extends in the axial direction of the outer pipes on a back side of the first weld at the contact portion, and a third weld that connects an end of the first weld with an end of the second weld on a side of an end face at the downstream end of the outer pipe.

3. The exhaust pipe structure for an in-line four-cylinder internal combustion engine according to claim 2, wherein
    a downstream end of the inner pipe has a recess that is recessed to an inside in a radial direction relative to an inner peripheral surface of the outer pipe to thereby form a gap between an outer peripheral surface of the inner pipe and the inner peripheral surface of the outer pipe, and
    the recess is disposed at a portion at which the recess crosses an array direction of the exhaust pipes and overlaps the weld.

4. The exhaust pipe structure for an in-line four-cylinder internal combustion engine according to claim 3, wherein the converging exhaust pipe is disposed so as to cover the downstream ends of the exhaust pipes from an outside and welded to the exhaust pipes.

5. The exhaust pipe structure for an in-line four-cylinder internal combustion engine according to claim 3, wherein
- the downstream end of the inner pipe has an abutment portion that abuts on the inner peripheral surface of the outer pipe, the abutment portion being disposed at a portion at which the abutment portion crosses a direction orthogonal to the array direction of the exhaust pipes, and
- the inner pipe is welded to the outer pipe at the abutment portion.

6. The exhaust pipe structure for an in-line four-cylinder internal combustion engine according to claim 1, further comprising:
- a catalyst apparatus disposed downstream of the converging exhaust pipe, the catalyst apparatus purifying exhaust gases, wherein
- the catalyst apparatus includes an upstream side catalyst and a downstream side catalyst disposed at a position spaced a distance away in an axial direction of the upstream side catalyst from the upstream side catalyst.

7. The exhaust pipe structure for an in-line four-cylinder internal combustion engine according to claim 1, further comprising:
- an exhaust pipe cover that covers the exhaust pipes from below and lateral sides, wherein
- in a front view, the exhaust pipes are exposed from the exhaust pipe cover.

* * * * *